April 16, 1935.  C. ROSATELLI  1,998,204
AIRCRAFT TAIL CHASSIS
Filed Dec. 29, 1932  4 Sheets-Sheet 1

Inventor,
Celestino Rosatelli
By Sommers & Young Attys.

April 16, 1935.  C. ROSATELLI  1,998,204
AIRCRAFT TAIL CHASSIS
Filed Dec. 29, 1932  4 Sheets-Sheet 2

Inventor
Celestino Rosatelli.
By Sommers & Young
Attys.

April 16, 1935.  C. ROSATELLI  1,998,204
AIRCRAFT TAIL CHASSIS
Filed Dec. 29, 1932    4 Sheets-Sheet 3

Inventor
Celestino Rosatelli.
By Sommers, Young Attys.

April 16, 1935. C. ROSATELLI 1,998,204
AIRCRAFT TAIL CHASSIS
Filed Dec. 29, 1932 4 Sheets-Sheet 4
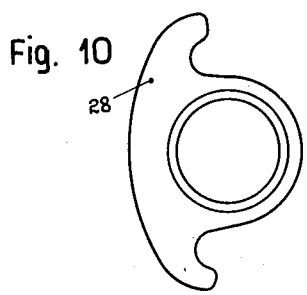
Fig. 10
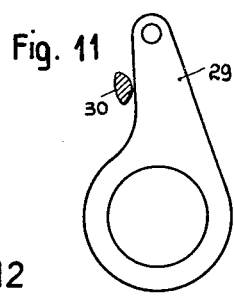
Fig. 11
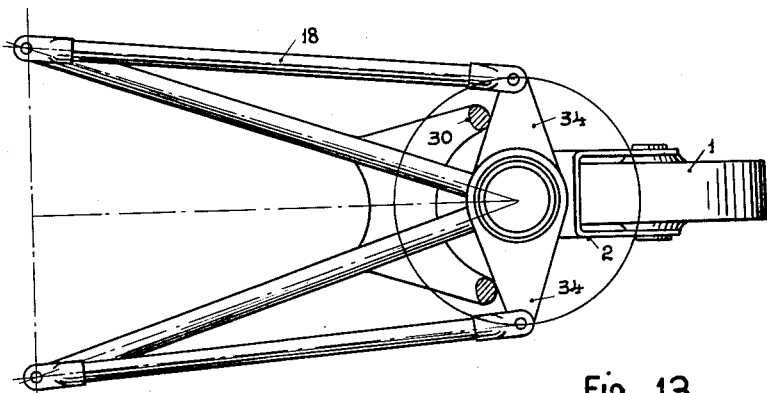
Fig. 12
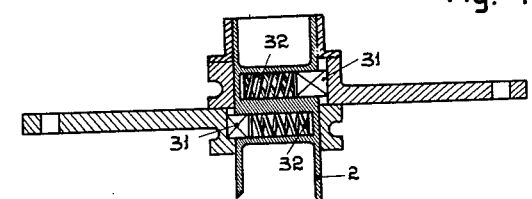
Fig. 13
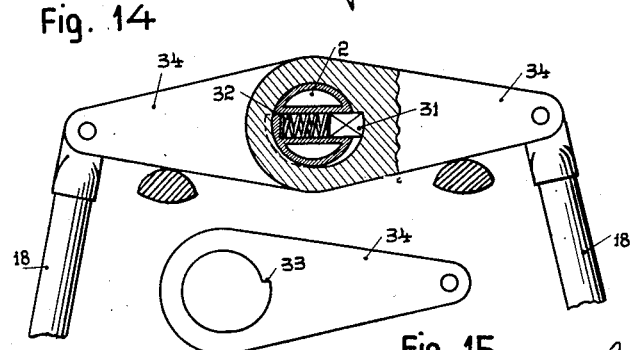
Fig. 14
Fig. 15
Inventor
Celestino Rosatelli
By Sommers & Young attys

UNITED STATES PATENT OFFICE 1,998,204

AIRCRAFT TAIL CHASSIS

Celestino Rosatelli, Turin, Italy

Application December 29, 1932, Serial No. 649,414
In Italy July 18, 1932

2 Claims. (Cl 244—2)

A front chassis and a rear skid have been employed heretofore on aircraft for taxiing and landing. Besides serving as a third point of support, the rear skid filled the function of utmost importance of braking the aircraft.

With the adoption of brakes on the chassis wheels, the braking action of the skid became superfluous and the skid has lately been replaced by a tail chassis which transforms the aircraft on the ground into a tricycle capable of any hazardous manœuvres.

Consequently, the tail chassis of aircraft which was used in the past only in special cases is apt to become an essential part in general use.

The wheel, however, should be pivoted or self swinging about an axis approximately normal to the ground line, in order to permit an easy handling of the aircraft on the ground.

The pivoted or self swinging wheel which is required also for the common manœuvres of the aircraft in the hanger has, however, the serious drawback of giving rise to objectionable yawing. It has been proposed to obviate this by employing spring members adapted to return the wheel to its normal central position, but the results have not so far been satisfactory.

The free steering of the tail chassis now in use shall always give rise to serious drawbacks, whenever the plane of the tail wheel moves away from the plane of symmetry of the aircraft, as this latter is rolling on the ground. The spring return members at present in use are not only rather inefficient, but they do not ensure the return of the wheel to its exactly centered position, so that when the aircraft is going to land the tail wheel may be out of its central position.

The adoption of a nonswinging tail wheel would seriously disturb the manœuvres of aircraft both in hangers and during taxiing and landing at reduced speed, while a tail chassis controlled by the pilot through connection to the pedal shows other serious dangers, which disturb and prevent in special cases the control of the rudder on the ground or in flight after a poor start.

This invention relates to an improved aircraft tail chassis which obviates all the disadvantages mentioned above.

According to this invention the tail wheel is maintained elastically orientable about an axis approximatively normal to the ground line and the spring member returns the wheel to the plane of symmetry into a strictly centered position. When the aircraft settles the wheel is always securely in the desired orientation.

Should an obstacle bring the wheel out it centered position during rolling, the device according to this invention rapidly and reliably centers it again.

A special releasing means enables the pilot to transform at will the resiliently braked steering mechanism for the tail chassis into a free steering mechanism such as is necessary for the usual manœuvres in the hangar and on the field at small speeds.

To permit the importance of this invention to be fully realized, reference will be made to the devices provided for the same purpose of maintaining the wheel in the vertical plane of symmetry of the fuselage prior to this invention.

The accompanying drawings show the devices chiefly devised and employed heretofore as well as three constructional forms of the object of this invention.

Figures 10 and 11 show in plan view the details of an anchor secured to the wheel carrying fork and of one of the two loose levers against which the spring members abut and on which the anchor acts separately according to the direction of rotation of the fork.

Figure 12 shows in plan view a further modification of the device according to this invention.

Figures 13 and 14 show in axial section and in partly sectional plan view, respectively, the detail of the actuating members for the loose levers which, in this construction, are arranged within the fork pin.

Figure 15 shows the detail of one of the loose levers of the device.

Figure 1:
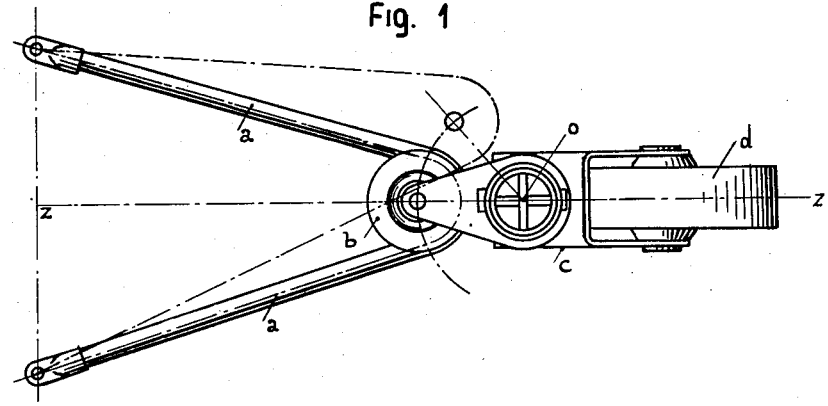
Figures 1 and 2 show in plan view two devices amongst those most frequently used heretofore for the purpose of keeping the tail chassis in the plane of symmetry.

Referring to Figure 1, which shows the device that has been most frequently used heretofore, an elastic cable a, (or a chain composed of a resilient portion and of a rigid portion) constitutes the equal sides of an isosceles triangle and passes at the apex thereof on a pulley $b$ keyed rigidly to the axis of the wheel carrying fork $c$ so as to vary the angular position of the fork and consequently of the tail wheel $d$.

It is clear, that upon small displacements of the wheel and therefore also of the pulley on which the resilient cable is wound, the arm by which the returning force acts with respect to the axis O of the fork is very small and therefore the returning moment is of very small intensity. Moreover, the returning moment decreases as the wheel deviations become smaller and therefore the system is totally inefficient in the case of small deviations which are, however, apt to produce dangerous yawing.

By this device the returning couple varies from a minimum to zero, while the resisting couple to be overcome is always above zero. The result is generally a balanced position which leaves the wheel out of the plane of symmetry $z$—$z$ with the serious drawbacks mentioned above.

Figure 2:
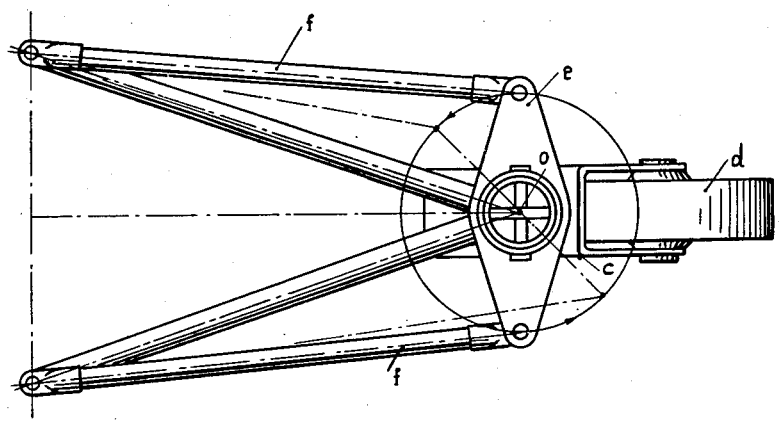
Figure 3:
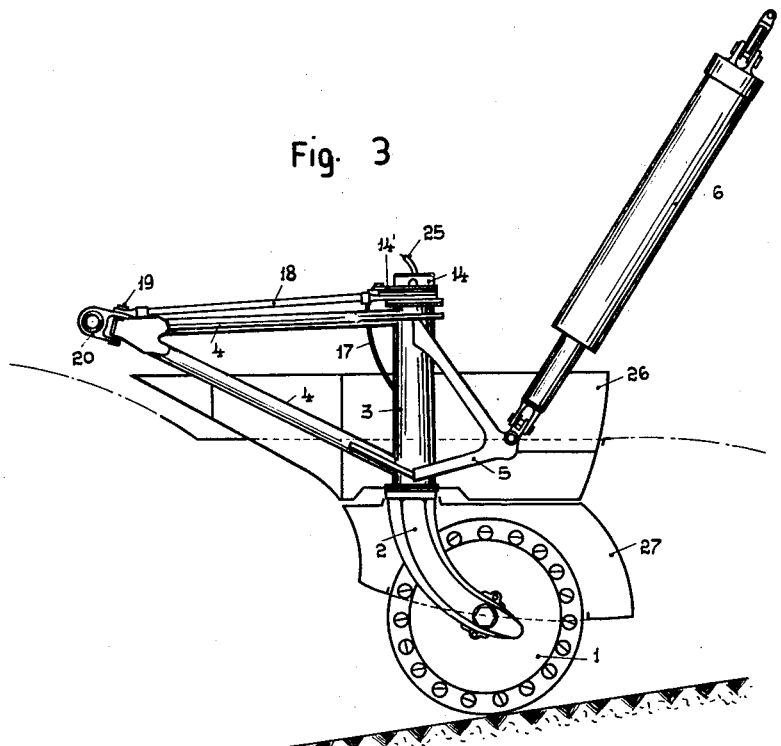
Figures 3 and 4 show in elevation and partial plan view, respectively, a tail wheel provided with the device according to this invention.
Figure 5:
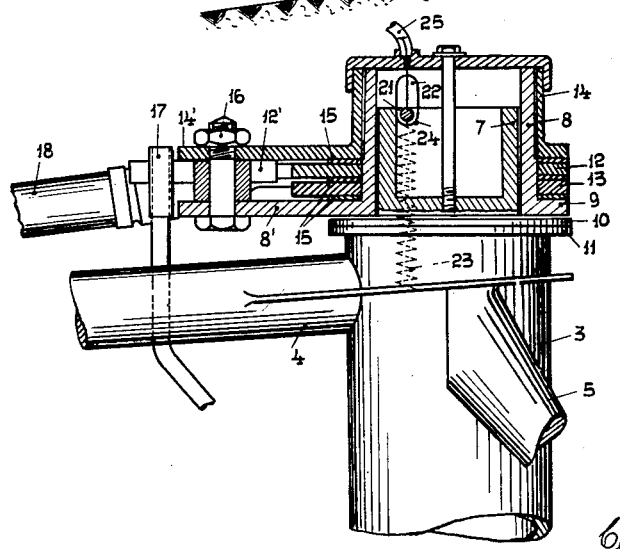
Figure 5 shows on an enlarged scale partly in section a detail of the device shown in Figures 3 and 4.
Figure 4:
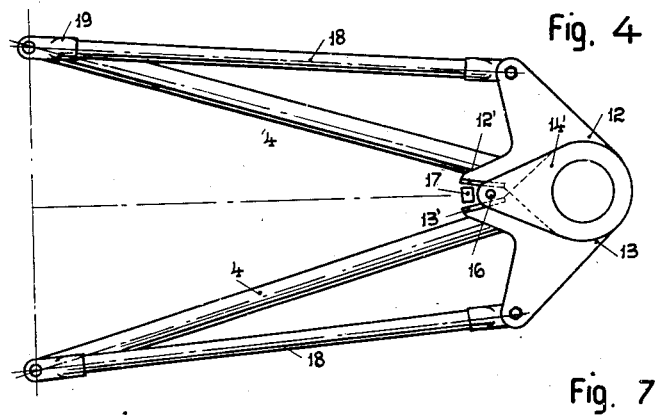
Figure 6:
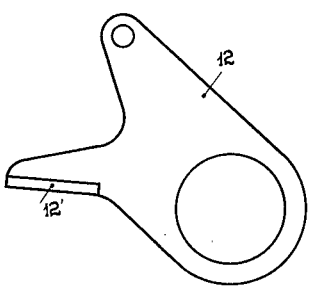
Figure 6 shows the detail of the loose levers connected with the spring members.
Figure 7:
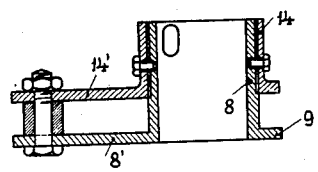
Figures 7 and 8 show in section and in plan view the detail of the operating lever actuating one or the other loose lever according to the direction of rotation of the wheel carrying fork.
Figure 8:
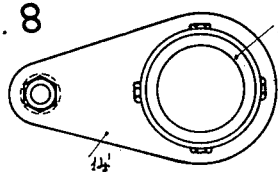

Referring to the device, also largely employed at present, shown in Figure 2, O denotes the axis of the fork $c$ on which a lever $e$ is rigidly keyed; the lever axis lying in a plane normal to the plane of symmetry when the tail wheel $b$ is on this latter plane. The lever $e$ carries at its ends two springs or elastics $f$ which abut at two fixed points on the fuselage, one on each side thereof.

By this arrangement, when the wheel $d$ is moved away from the plane of symmetry under the action of an external force, one of the two springs or elastics, $f$ which are mounted under equal initial tensions, is subjected to an increase in tension while the tension of the other is weakened, and the deformations can be held to be approximately equal to the arcs described by the points of connection to the levers $e$.

In this case, however, the returning couple is given by the difference between the tensions of the two elastics $f$ multiplied by the lever arm of said difference, and therefore this couple becomes smaller as the lever more closely approaches the position in which its axis is normal to the plane of propulsion.

Therefore the returning couple tends in this case also towards zero when the wheel approaches the plane of symmetry, this giving rise to the same drawbacks mentioned with reference to the former device.

Moreover, should the initial tensions of the elastics $f$ not be absolutely equal (which may easily happen in practice) or should one of them become weaker than the other the balanced position of the wheel $d$ under the action of the two elastics $f$ might be caused to lie permanently out of the centered position, as the above mentioned arrangement makes it impossible to provide a stop that will maintain the wheel in the strictly desired position.

The construction according to this invention eliminates in the simplest and safest manner all the drawbacks described.

Referring to Figures 3, 4, 5, 6, 7 and 8 showing a first constructional form given by way of example, $I$ indicates the pivoted or self-swinging tail wheel carried by a fork 2 pivoted in a tubular member 3, to which the front posts 4 and rear posts 5, constituting the wheel support, are solidly connected. The front posts 4 are connected by means of articulated joints to the fuselage, while the rear posts 5 are connected with the shock absorber 6 articulated in turn to the fuselage.

A sleeve 8 is mounted at the upper end of the pin 7 integral with the wheel carrying fork 2. The pilot can at will fixedly connect this sleeve to the pin 7 and therefore to the fork 2 or he can loosely connect it therewith. The device for coupling the two members shall be described hereinafter.

The sleeve 8 carries solidly attached thereto two levers 8' and 14' acting in parallel and connected together by the pivot 16. The lever 8' is integral with the sleeve 8, while owing to mounting reasons the lever 14' is attached by its hub 14 to the said sleeve.

In the space comprised between these two levers, two levers 12 and 13 are loosely mounted and carried along in rotation individually through the motion of the pivot 16.

The construction of the driving levers made of two parts 8' 14' has been given by way of example, but it is well understood that any other construction suitable for the same purpose can be employed according to this invention. By way of example, a single actuating lever and two loose levers 12 and 13 can be employed which might be arranged one above and the other underneath or both above or underneath the actuating lever, one or the other loose lever being carried along in rotation according to the direction of rotation of the fork.

The levers 12 and 13 as shown are provided with a suitable extension 12', 13', respectively, which rests on the actuating levers 8', 14' and carry at their ends the resilient member 18 anchored to the knot 19 which, in this case, is integral with the movable equipment carrying the tail wheel. The resilient member 18 can be anchored at another point of the fuselage not integral with the movable equipment, when the special length of this member should require it.

A stop member 17 secured to the tubular member 3 serves as an abutment for the loose levers 12, 13 which rest thereon, thus ensuring the return of the tail wheel to the strictly required position.

The drawings show also a construction of the device adapted to fixedly connect at will the actuating lever 8', 14' with the wheel carrying fork 2; this device includes a remote control clutch with a pivot 21 normal to the axis of the fork and eccentrically arranged with respect thereto, which is movable in slits 22 cut in the sleeve 8 and is urged by springs 23 which tend to bring it and to maintain it in engagement with notches 24 cut on the end edge of the pivot 7 of the fork. A Bowden cable 25 serves for lifting the pivot 21 out of the notches 24 and thus releases the fork which can freely swing about its axis of rotation.

The working is as follows: in the manœuvre on the ground for taxiing the aircraft or rolling it into the hangar, the clutch 21, 24 is uncoupled so as to release the tail wheel $I$ which can thus work like a usual self swinging roller. The coupling is clutched in for starting and landing.

When the tail wheel is moved away from the plane of symmetry, one of the two loose levers is carried in rotation by the fork axle as if such lever were integral with this axle, while the other lever remains in its inoperative position against the stop.

In this manner one of the resilient members exerts all its return action on the lever which has moved away from the inoperative position, while the other resilient member performs its function, otherwise counteracting, against the stop which supports the loose lever which is not carried along in rotation. According to the direction in which the wheel 1 is displaced with respect to the plane of symmetry one or the other loose levers will be moved.

In flight, the coupling is always clutched in for maintaining the tail wheel in the vertical longitudinal plane of the fuselage so as to offer the least head resistance; for this purpose both the tail chassis and the tail wheel are lined as usual with a streamlined hood 26—27.

Figure 9:
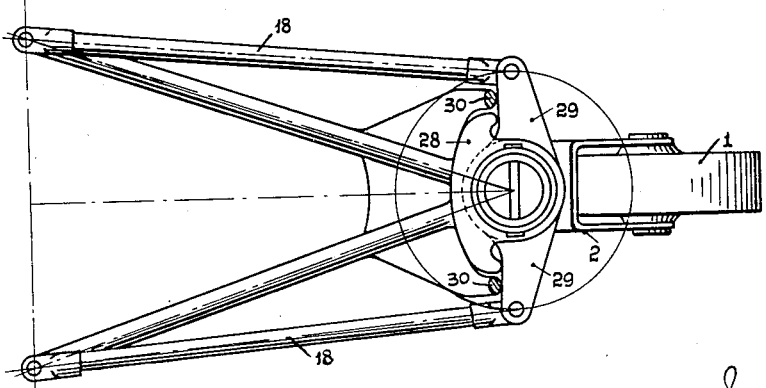
Figure 9 shows in plan view a modification of the device according to this invention.

Referring to the modification shown in Figures 9 to 11, in this construction the fork 2 carrying the wheel 1 is rigidly keyed at its upper end to an anchor 28 (shown in detail in Figure 10) which acts separately, according to the direction of rotation, on one of the two loose levers 29, (see also the detail on Figure 11), to which the resilient members 18 abut. The said levers 29 rest at their outer end against stops 30 of which the position is unvariable with respect to the middle vertical plane of the fuselage, which stops ensure at rest the exact adjustment of the wheel 1 in the plane of symmetry.

Referring to the second modification shown by way of example in Figs. 12 to 15, the upper end of the fork 2, carrying the wheel 1, is provided with two radial keys 31 urged outwardly by reaction springs 32 which engage individually and according to the direction of rotation of the fork 2 with teeth 33 cut on the return levers 34 to which the resilient members 18 abut as usual. During rotation, while one of the pawls or keys 31 engages in the above explained manner one of the levers 34, the other pawl 31 rotates with respect to the second lever 34 which remains stationary, and recedes into its seat owing to the spiral form of the recess formed within the levers (see Figures 14 and 15).

It will be obvious that the form and constructional details of the tail wheel, resilient members and coupling can be varied from what has been described by way of example according to practical requirements, without departing from the spirit of this invention.

What I claim is:—

1. Aircraft tail chassis comprising, in combination, a frame having a fork carrying a wheel, said fork having a stem mounted in said frame to oscillate, bell crank levers loosely mounted on said stem, stop means, against which abuts an arm of said levers, the other arm of said levers being substantially perpendicular to the longitudinal axis of said frame when the wheel of said fork is in its centered position, elastic rods connecting the ends of the arms, perpendicular to the longitudinal axis of the frame, of said levers to the front end of said frame, an actuating arm loosely mounted on the stem of said fork and acting alternatively on said levers against the action of said elastic rods and a clutch between said arm and the wheel stem for securing, at will, said arm to said stem.

2. Aircraft tail chassis, as claimed in claim 1, in which the actuating arm has a hub mounted on the stem and provided with longitudinal slots, the stem having notches, the clutch comprises a pin movably mounted in the longitudinal slots of the hub, the axis of said slits lying in a plane parallel to the longitudinal axis of the stem and adapted to be brought at will in engagement with the notches in the stem to connect said stem to the hub for rotation therewith.

CELESTINO ROSATELLI.